(12) United States Patent
Looney et al.

(10) Patent No.: US 8,770,891 B2
(45) Date of Patent: Jul. 8, 2014

(54) VAPOR PHASE ELEMENTAL SULFUR AMENDMENT FOR SEQUESTERING MERCURY IN CONTAMINATED SOIL

(75) Inventors: Brian B. Looney, Aiken, SC (US); Miles E. Denham, Aiken, SC (US); Dennis G. Jackson, Augusta, GA (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 206 days.

(21) Appl. No.: 13/455,718

(22) Filed: Apr. 25, 2012

(65) Prior Publication Data

US 2013/0287497 A1 Oct. 31, 2013

(51) Int. Cl.
*B09C 1/00* (2006.01)

(52) U.S. Cl.
USPC .................................................. 405/128.75

(58) Field of Classification Search
USPC ............................. 405/128.1, 128.5, 128.75
See application file for complete search history.

(56) References Cited

U.S. PATENT DOCUMENTS

| | | | |
|---|---|---|---|
| 4,266,512 A | | 5/1981 | Setala et al. |
| 4,354,942 A | | 10/1982 | Kaczur et al. |
| 5,347,072 A | * | 9/1994 | Adams ........................ 405/128.6 |
| 5,478,540 A | | 12/1995 | Walles et al. |
| 5,562,589 A | * | 10/1996 | Adams ..................... 405/128.55 |
| 5,569,154 A | * | 10/1996 | Navetta ..................... 405/128.85 |
| 5,595,644 A | | 1/1997 | Doring et al. |
| 6,911,570 B2 | | 6/2005 | Broderick et al. |
| 6,962,466 B2 | * | 11/2005 | Vinegar et al. ............. 405/128.4 |
| 7,692,058 B2 | | 4/2010 | Fuhrmann et al. |
| 8,025,160 B2 | | 9/2011 | Wang et al. |

FOREIGN PATENT DOCUMENTS

JP 56007697 1/1981

OTHER PUBLICATIONS

Lawrence N. Oki; Mercury Disposal Via Sulfur Reactions; www.ascelibrary.org Jul. 13, 2011; Journal of Environmental Engineering/Oct. 1998, 9 pages.

F.A.Lpex, F.J. Alguacil, C.P. Roman, H. Tayibi and A. Lopez-Delgado; Disposal of Elemental Mercury via Sulphur Reaction by Milling; Department of Primary Metallurgy and Materials Recycling, National Centre for Metallurgical Research; International Conference on "Hazardous Waste Management" Oct. 1-3, 2008.

Sven Hagemann; Technologies for the Stablization of Elemental Mercury-Containing Wastes; Oct. 2009; German Federal Minstry for the Environment, Nature Conservation and Nuclear Saefty (BMU); 57 pages.

Elsa Cabrejo; andElizabeth Phillips; In Situ Remediation and Stabilization Technologies for Mercury in Clay Soils; US Department of Energy Apr.-Jul. 2010; 31 pages.

US Environmental Protection Agency; Treatment for Mercury in Soil, Waste and Water; Aug. 2007; 13 pages.

* cited by examiner

*Primary Examiner* — John Kreck
(74) *Attorney, Agent, or Firm* — J. Bennett Mullinax, LLC

(57) ABSTRACT

The process of treating elemental mercury within the soil is provided by introducing into the soil a heated vapor phase of elemental sulfur. As the vapor phase of elemental sulfur cools, sulfur is precipitated within the soil and then reacts with any elemental mercury thereby producing a reaction product that is less hazardous than elemental mercury.

11 Claims, 3 Drawing Sheets

VAPOR PHASE ELEMENTAL SULFUR AMENDMENT FOR SEQUESTERING MERCURY IN CONTAMINATED SOIL

STATEMENT AS TO RIGHTS TO INVENTIONS MADE UNDER FEDERALLY SPONSORED RESEARCH AND DEVELOPMENT

This invention was made with Government support under Contract No. DE-AC09-08SR22470 awarded by the United States Department of Energy. The Government has certain rights in the invention.

FIELD OF THE INVENTION

This invention is directed towards a process of in-situ sequestration of elemental mercury within soils.

BACKGROUND OF THE INVENTION

This invention relates to a process for treating soils to reduce the concentration of elemental mercury in soils. Elemental mercury is a common contaminant in soils near chlor-alkali facilities, mercury mining/retort sites, gold mining sites, natural gas pipeline transfer and processing stations, industrial facilities that produce mercury compounds, facilities that use (or have used) mercury manometers, and specialized operations such as the Y-12 Plant at Oak Ridge. To date, the most common strategy to address elemental mercury in soil is physical removal (digging up the soil) for offsite disposal or processing. Physical removal is costly at most sites and may not be feasible at many sites due to contamination depth or cultural interferences (buildings, utilities, roads, etc.). As a result, a variety of "in situ" techniques have been developed or proposed to address elemental mercury contamination in soils without the need for physical removal.

U.S. Pat. No. 7,692,058 describes a process to extract elemental mercury from soils in which heated tubes are used to create migration conditions for mercury in the soil which reacts with sulfur reagent sinks. The elemental mercury migrates to a column of sulfur and reacts to form a mercury sulfide compound. This technology requires using heat to establish an increased vapor phase concentration that will encourage mercury diffusion toward the sulfur sink, but this process does not effectively address residual mercury that may remain present throughout the soil as the site approaches cleanup.

U.S. Pat. No. 6,962,466 discloses a mercury vaporization system within soil using heat in conjunction with a vacuum system to increase vapor phase concentrations and remove mercury vapors in the produced soil gases. The technology described in the '466 patent does not address residual amounts of mercury that would remain throughout the soil as the site approaches cleanup.

U.S. Pat. No. 4,354,942 describes an "in situ" process for stabilizing soluble mercury using inorganic sulfur compounds. The process is used for land areas including landfills and low ground sediment deposits. The sulfur stabilizing compounds require physical mixing into upper soil layers and then relies upon rainfall or irrigation to introduce the sulfur agents to low ground. The stabilizing agent may also be introduced using high-pressure injectors or other injection methods or equipment commonly used in hydrology and petroleum technology.

U.S. Pat. No. 5,595,644 discloses a physical intermixing of mercury contaminants with the gaseous solution of sulfur trioxide. Elevated temperatures to increase the efficiency of the reaction are discussed but the technology is directed to some type of above ground reactor or processing of the materials and does not discuss an "in situ" process.

U.S. Pat. No. 8,025,160 discloses using sulfur-impregnated clays to function as a removal media for mercury compounds. The disclosure is directed towards using the reactive media in some type of above ground reactor and does not envision "in situ" treatment of soils.

There remains a need for a process of treating or stabilizing elemental mercury present in soils which is compatible with low levels of mercury that remain in soils following traditional mercury removal steps. Accordingly, there remains room for improvement and variation within the art.

SUMMARY OF THE INVENTION

It is one aspect of at least one of the present embodiments to provide a process for treating elemental mercury in soil in which a heated elemental sulfur vapor is introduced into a soil substrate. As the heated vapor migrates through the soil and is cooled, the resulting deposited sulfur will react with elemental mercury present in the soil.

It is yet another aspect of at least one embodiment of the present invention to provide for a process of treating soils contaminated with elemental mercury comprising:

A process of treating in-situ mercury contamination within a soil comprising steps of:
 introducing into a soil a sulfur vapor;
 allowing the sulfur vapor to precipitate as elemental sulfur throughout the soil;
 reacting the precipitated sulfur with elemental mercury present within the soil, thereby producing a reaction product of elemental mercury and elemental sulfur.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

Figure 1:
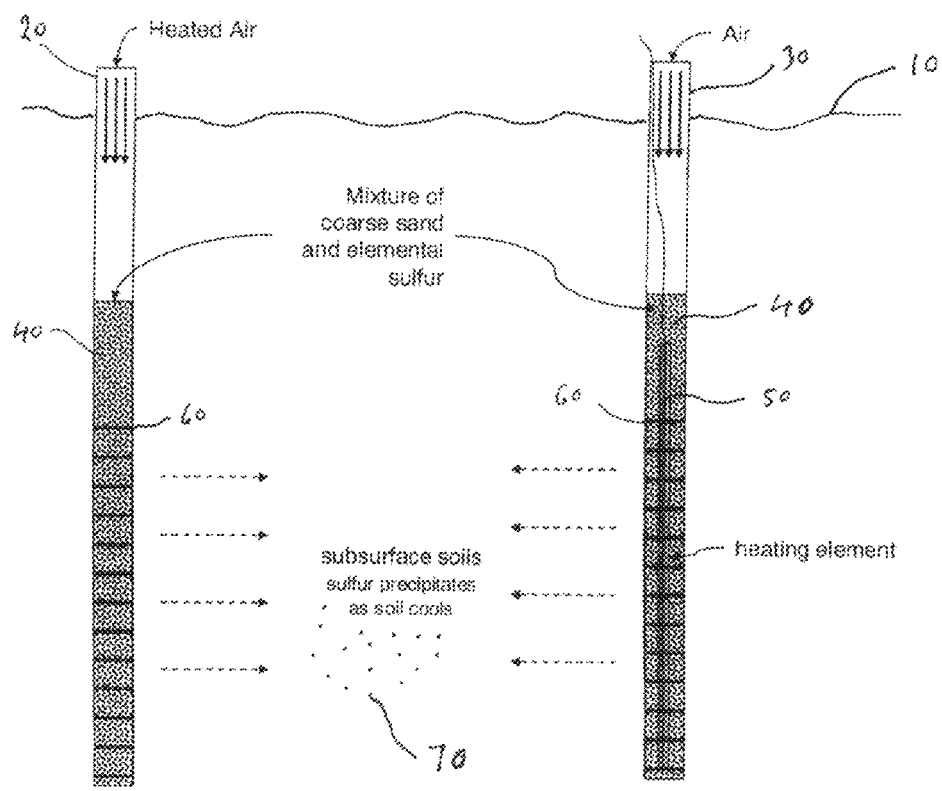
FIG. 1 sets forth access wells depicting various ways of introducing elemental sulfur into a subsurface soil reaching.

As best seen in reference to FIG. 1, one process for direct treatment of soils that contain small and well-confined quantities of mercury contamination involves injecting a sulfur vapor heated gas into one or more access wells to distribute the gas through out the contaminated subsurface. As seen in reference to FIG. 1, access wells 20 and 30 can be provided which are in communication with the plurality of outlet 60 positioned along a lower link of the well. Access well 20 using a supply of heated air introduced in the upper portion of well 20. The heated air interacts with region 40 which may be a mixture of coarse sand or other particulate matter with elemental sulfur. The heated air will create a sulfur vapor which is then distributed through outlet 60 into the subsurface soil where it will precipitate as sulfur particles 70. The sulfur vapor and sulfur particles 70 can then react with any elemental mercury present in the soil.

As seen in access well 30, one variation is to use ambient temperature air introduced to access well 30 in which heating elements 50 are used to heat the mixture 40 of coarse sand and elemental sulfur. In this manner, the sulfur is vaporized and the air pressure directs the elemental sulfur vapor through the plurality of outlet 60 and into the subsurface soil where precipitates 70 of sulfur will form.

Solid sulfur will precipitate in the cool soil reacting with mercury present leaving a residual phase of additional sulfur to provide for barrier conditions that would limit further mercury mobility and/or availability. Suitable temperatures for heating the elemental sulfur can range from approximately 100° C. to 207° C. or higher. The higher the temperature, the greater the vapor pressure (concentration) of sulfur within the heated air. As a general rule, the temperature can be selected depending upon the needed migration distance adjacent the access well. As a general rule, the greater the temperature of the feed gas containing elemental sulfur vapor, the farther the distance an effective amount of elemental sulfur is distributed relative to the access well release points. One having ordinary skill in the art could modify the temperature used to create the elemental sulfur vapor, the injection porosity/pressure of the introduced sulfur vapor based on the extent and size of the elemental mercury contamination, the porosity and permeability of the sulfur soil to the elemental mercury vapor so as to achieve the most economical conditions for distributing elemental sulfur within the soil.

Elemental sulfur both in a solid and vapor phase is capable of reacting with elemental mercury. As is appreciated by one of ordinary skill in the art, elemental mercury present in the soil is in either a vapor phase or a liquid phase. The elemental sulfur is capable of reacting with vapor phase mercury as well as liquid phase mercury. One attribute of the present invention is the ability to disperse elemental sulfur in an area wider than the elemental mercury contamination so as to provide a encapsulating reaction zone that will prevent further migration of mercury. As mercury is released and migrates through the soil, the mercury will encounter the introduced elemental sulfur and react, forming a stable reaction product which is less toxic and less prone to soil migration.

The resulting process promotes the sequestering of elemental mercury as a more stable form of mercury, e.g. cinnabar, mercury II sulfide. As used herein, the term "more stable" refers to reaction products of mercury such as mercury II sulfide which is less toxic, less soluble, and less mobile when present in a soil or a subsurface environment. While the heated gas used to establish the sulfur vapor phase can be air, it is recognized that other gas sources such as nitrogen gas that are utilized for other purposes can also be used to bring about the gas-phase delivery of elemental sulfur.

Figures 2A, 2B:
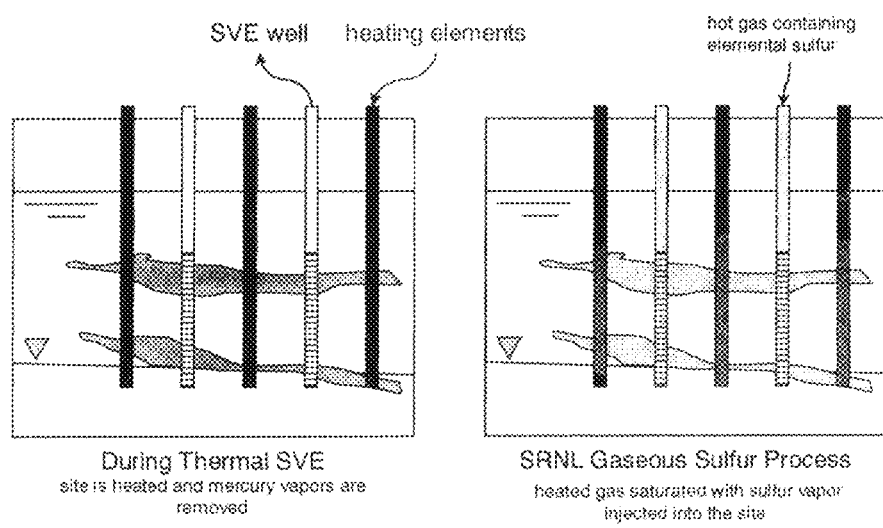
FIG. 2A sets forth a thermal heating technique in which mercury vapors can be removed.
FIG. 2B illustrates additional process of using injected sulfur vapor in conjunction with a thermal vapor extraction methodology as set forth in FIG. 2A.

As been seen in reference to FIGS. 2A and B, an additional embodiment of the present invention makes use of existing technologies to remove elemental mercury from the soil using a high temperature vapor extraction process. As set forth in U.S. Pat. No. 6,962,466 and which is incorporated herein by reference, heating soils to a temperature sufficient to volatilize mercury along with a simultaneous removal of subsurface gases will remove the volatilize mercury from contaminated soils as illustrated in FIG. 2A. While the vapor extraction process will remove a significant amount of mercury from the soil, complete removal is difficult and the process leaves the soil with low levels of elemental mercury contamination.

The present invention lends itself as a useful addition to high vapor soil vapor extraction. The embodiment seen in reference to FIG. 2B takes advantage of the existing equipment and processes used to establish a high temperature environment dealing with the active extraction process. It is considered that following the vapor removal of mercury from the heated soil that the same high temperature heating elements can be used to maintain elevated temperatures within the soil while sulfur vapor is distributed throughout the contaminated soil. The sulfur vapor can react directly with mercury vapor. The existing high temperatures of the soil will allow for the greater diffusion of the elemental sulfur vapor. As the soil cools, the vapor-based sulfur is deposited within the soil where it will react with the remaining amounts of elemental mercury as well as forming a broad zone of a reactive soil layer having residual elemental sulfur that can interact with any unreacted elemental mercury that may migrate through the soil. It is considered that the precipitation of elemental sulfur within a soil as set forth in the present invention offers key improvements in the ability to bind and sequester elemental mercury in situ. The excess sulfur that remains within the soil can react with any residual mercury that may diffuse slowly out of clay layers and other low permeability materials over time.

Figure 3:
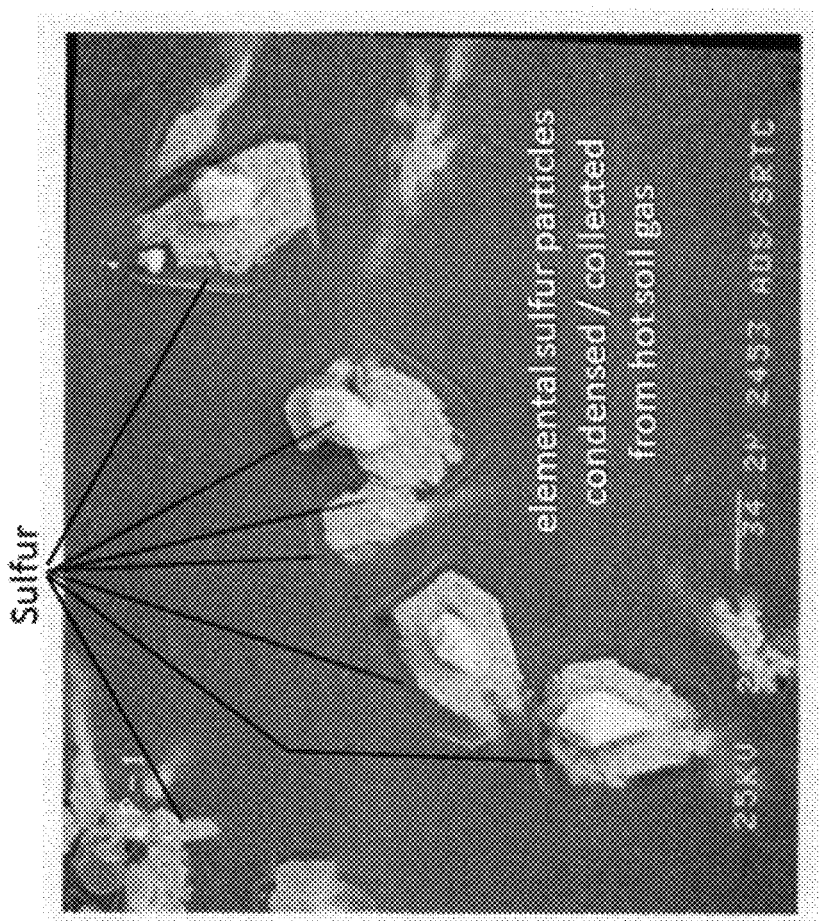
FIG. 3 is an electron micrograph of elemental sulfur precipitated from heated soil gas.

As seen in reference to FIG. 3, the electron micrograph reveals particles of elemental sulfur which have precipitated from heated soil gas containing sulfur vapor. The ability to visualize precipitated elemental sulfur along with visualization of reaction products of elemental sulfur and elemental mercury, allows the monitoring and sampling of soil substrates to verify that adequate sulfur precipitation has occurred within a given soil sample. Such monitoring can help ensure that an effective amount of elemental sulfur is present and to the expected reaction product of mercury II sulfide has occurred.

A gas blower system to generate a flow of carrier gas, a heating system, a means to contact the carrier gas with elemental sulfur at an elevated temperature, and delivery piping and wells (heated as needed to keep the sulfur in the gas phase) may be utilized to deliver sulfur vapor to a subsurface region. The amount of sulfur delivered is calculated based on vapor pressure relationships as a function of the contact temperature of the carrier gas and sulfur. The following table provides information on the vapor pressure of elemental sulfur as a function of temperature and illustrates how a system would be designed to deliver various amounts of sulfur using an exemplar of a standard blower size used in environmental applications providing 3000 std L/min of carrier gas.

| temperature (celsius) | vapor pressure | | | Sulfur delivery using carrier gas flow of 3000 std L/min heated to listed temperature in equilibrium with elemental sulfur based on vapor pressure | |
|---|---|---|---|---|---|
| | partial pressure (pascals, Pa) | (at std conditions) | grams sulfur per std L | Kg sulfur per minute | Kg sulfur per day |
| 102 | 1 | 9.87E−06 | 1.41E−05 | 4.23E−05 | 6.09E−02 |
| 135 | 10 | 9.87E−05 | 1.41E−04 | 4.23E−04 | 6.09E−01 |
| 176 | 100 | 9.87E−04 | 1.41E−03 | 4.23E−03 | 6.09E+00 |
| 207 | 272 | 2.69E−03 | 3.84E−03 | 1.15E−02 | 1.66E+01 |
| 235 | 1000 | 9.87E−03 | 1.41E−02 | 4.23E−02 | 6.09E+01 |
| 318 | 10000 | 9.87E−02 | 1.41E−01 | 4.23E−01 | 6.09E+02 |
| 444 | 100000 | 9.87E−01 | 1.41E+00 | 4.23E+00 | 6.09E+03 |

Using a carrier gas flow of 3000 std L/min and the sulfur vapor pressure at a gas temperature of 176° C., the table documents a calculated delivery of about 6 kilograms of sulfur per day. Increasing the temperature to 235° C. would increase the amount of delivered sulfur to about 60 kilogram, of sulfur per day. The rate of sulfur delivery rates for other combinations of temperature and flow rate are easily calculated.

The vapor pressure relationships described above provide the general-unconstrained basis for sulfur delivery to the subsurface. In practice, the design of the sulfur contactor, the carrier gas flow and composition, and the selected temperature of the carrier gas would be based on the required quantity of sulfur delivery and the distribution of the sulfur in the subsurface. The minimum target sulfur quantity for delivery would be based on the expected total amount of mercury to be treated and the 1:1 molar stoichiometry of the spontaneous reaction of elemental sulfur and elemental mercury to form stable mercury sulfide (Hg+S→HgS). The sulfur contactor system would be sized to hold the required quantity of sulfur over the course of the deployment. The carrier gas flow and temperature determine the required time-frame for the deployment. While a wide range of temperatures are theoretically viable, a practical range of temperatures is approximately bounded by the boiling point of water (100° C.) and the flash point temperature for vapor phase sulfur (207° C.). At the practical lower bound (100° C.), the theoretical sulfur delivery rates at carrier gas temperatures that are at or below the boiling point of water are less than 0.06 Kg of sulfur per day and the presence of water in the subsurface and associated rapid cooling of the carrier gas would limit the migration distance of sulfur away from the delivery location. At temperatures exceeding the practical upper bound (207° C.), the vapor phase concentration of sulfur would exceed flashpoint, necessitating increased costs and additional safety measures (such as using inert gases or steam for the carrier gas). Moreover, at the upper bound the amount of sulfur in the gas is relatively high, delivering over 16 Kg of sulfur per day in the tabulated example, leading to the potential for subsurface clogging.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

That which is claimed:

1. A process of treating in-situ elemental mercury contamination within a soil comprising steps of:
   providing an in-situ soil substrate having elemental mercury contamination;
   introducing a supply of sulfur into a below ground region in proximity to the in-situ soil substrate;
   heating the supply of sulfur in the below ground region to form a sulfur vapor;
   directing the sulfur vapor from the below ground region and into the in-situ soil substrate having elemental mercury contamination;
   precipitating, the sulfur within the in-situ soil substrate;
   allowing the precipitated sulfur to react with residual elemental mercury present within the soil, thereby forming a reaction product of a mercury sulfide.

2. The process according to claim 1 wherein said step of introducing into a soil a sulfur vapor further comprises passing heated air through a mixture of course sand and elemental sulfur.

3. The process according to claim 1 wherein said step of introducing into a soil a sulfur vapor further comprises introducing a sulfur vapor through an access well.

4. The process according to claim 1 wherein said heating step further comprises heating the elemental sulfur to a temperature of between about 100° C. to about 207° C.

5. The process according to claim 1 wherein the step of heating a supply of elemental sulfur further comprises heating a supply of elemental sulfur present within an access well.

6. The process according to claim 1 wherein said step of heating further comprises heating the elemental sulfur to a temperature of at least about 100° C.

7. The process according to claim 1 wherein said heating step further comprises heating the elemental sulfur to a temperature of between about 100° C. to about 207° C.

8. The process according to claim 5 wherein said heating step further comprises heating the elemental sulfur to a temperature of between about 100° C. to about 207° C.

9. A process of treating elemental mercury within a soil comprising steps of:

heating a subsurface soil to a temperature sufficient to enhance vapor phase concentration of elemental mercury present within the soil;

using vapor extraction to remove vaporized elemental mercury from the soil;

introducing a vapor phase of elemental sulfur into the heated soil by passing heated air through a mixture of coarse sand and elemental sulfur, thereby distributing the elemental sulfur throughout the mercury contamination zone;

allowing the sulfur vapor to react with vapor phase elemental mercury to form a reaction product of a mercury sulfide;

cooling said soil and thereby precipitating the vapor phase sulfur within the soil;

allowing the precipitated sulfur to react with residual elemental mercury present within the soil thereby forming a reaction product of mercury sulfide.

10. A process of treating in-situ elemental mercury contamination within a soil comprising steps of:

introducing into a soil contaminated with mercury a sulfur vapor, the sulfur vapor formed by heating elemental sulfur present within an access well;

allowing the sulfur vapor to react with a vapor phase elemental mercury present in the soil to form a stable and nontoxic reaction product of mercury sulfide;

precipitating a portion of the sulfur vapor as elemental sulfur within the contaminated soil region;

reacting the precipitated elemental sulfur with residual elemental mercury present within the soil, thereby forming a reaction product, of a mercury sulfide.

11. The process according to claim 1 wherein said process comprises the additional step of reacting sulfur vapor introduced into the soil with a vapor phase of elemental mercury present within the soil.

* * * * *